(12) United States Patent
An et al.

(10) Patent No.: US 9,027,028 B2
(45) Date of Patent: May 5, 2015

(54) CONTROLLING THE USE OF COMPUTING RESOURCES IN A DATABASE AS A SERVICE

(71) Applicant: International Business Machines Corporation, Armonk, NY (US)

(72) Inventors: Wen Hao An, Beijing (CN); Li Ya Fan, Beijing (CN); Bo Gao, Beijing (CN); Chang Jie Guo, Beijing (CN); Berthold Reinwald, San Jose, CA (US); Wei Sun, Beijing (CN); Ning Wang, Beijing (CN); Zhi Hu Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 13/685,141

(22) Filed: Nov. 26, 2012

(65) Prior Publication Data

US 2013/0139172 A1      May 30, 2013

(30) Foreign Application Priority Data

Nov. 25, 2011    (CN) .......................... 2011 1 0401020

(51) Int. Cl.
  *G06F 9/46*    (2006.01)
  *G06F 9/50*    (2006.01)

(52) U.S. Cl.
  CPC ............ *G06F 9/5005* (2013.01); *G06F 9/5027* (2013.01); *G06F 2209/508* (2013.01); *G06F 2209/504* (2013.01)

(58) Field of Classification Search
  None
  See application file for complete search history.

(56) References Cited

U.S. PATENT DOCUMENTS 7,171,420 B2    1/2007    Iyer et al.
2009/0288084 A1    11/2009    Astete et al.
2010/0005055 A1*    1/2010    An et al. .......................... 707/2
2010/0049570 A1    2/2010    Li et al.
2010/0063959 A1*    3/2010    Doshi et al. ................... 707/618
2010/0077449 A1    3/2010    Kwok et al.
2010/0082322 A1    4/2010    Cherkasova et al.

(Continued)

FOREIGN PATENT DOCUMENTS

JP    2009176097    1/2008
WO    2011074516    6/2011

OTHER PUBLICATIONS

Zhu et al., "A Dynamic Resource Allocation Algorithm for Database-as-a-Service", Proceedings of the 2011 IEEE International Conference on Web Services, IEEE, pp. 564-571. DOI 10.1109/ICWS.2011. 64. Aug. 2011.

IBM, "Method to manage reservation and allocation of scarce resources shared by resources in a massively multi-tenant environment" Abstract only, Ip.com, Publishes Oct. 2009, p. 1-6.

(Continued)

*Primary Examiner* — Emerson Puente
*Assistant Examiner* — Dong Kim
(74) *Attorney, Agent, or Firm* — Fleit Gibbons Gutman Bongini & Bianco PL; Michael DeLuca

(57) ABSTRACT

A method and apparatus controls use of a computing resource by multiple tenants in DBaaS service. The method includes intercepting a task that is to access a computer resource, the task being an operating system process or thread; identifying a tenant that is in association with the task from the multiple tenants; determining other tasks of the tenant that access the computing resource; and controlling the use of the computing resource by the task, so that the total amount of usage of the computing resource by the task and the other tasks does not exceed the limit of usage of the computing resource for the tenant.

18 Claims, 7 Drawing Sheets

(56) References Cited

U.S. PATENT DOCUMENTS

Figure 1:
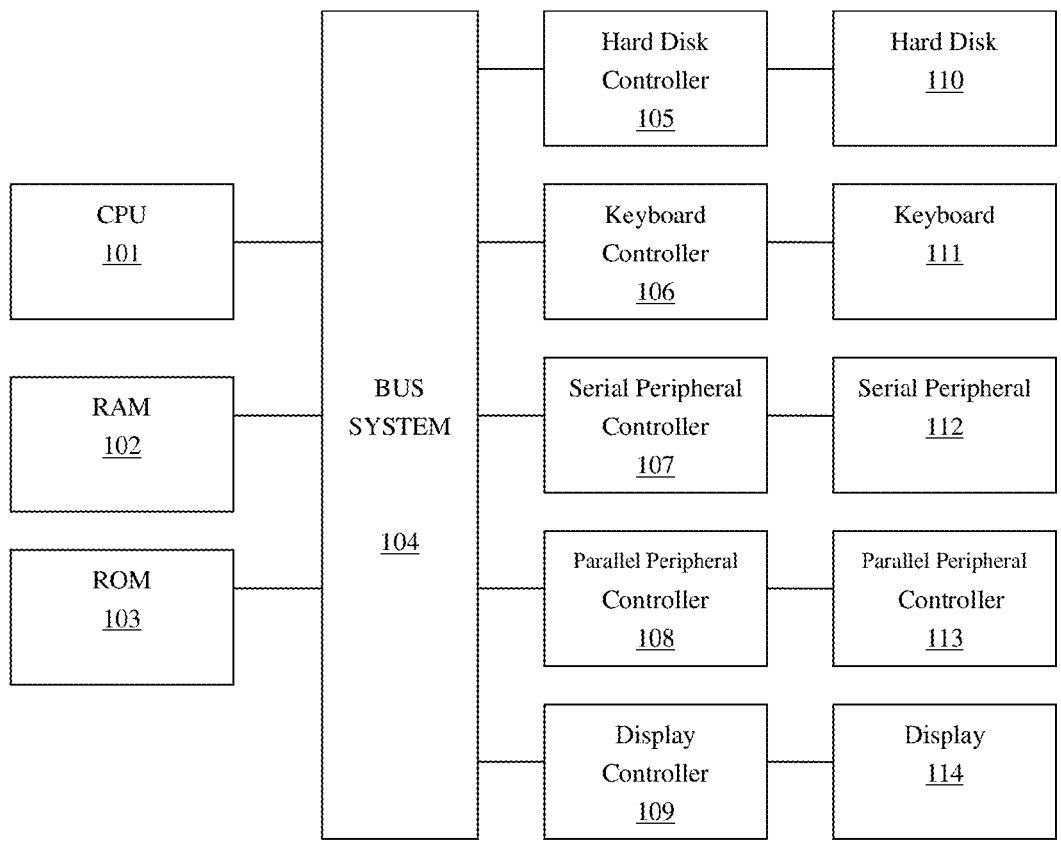

| | | | |
|---|---|---|---|
| 2010/0125612 A1* | 5/2010 | Amradkar et al. | 707/802 |
| 2010/0235495 A1 | 9/2010 | Petersen et al. | |
| 2011/0258630 A1* | 10/2011 | Fee et al. | 718/101 |
| 2012/0016681 A1* | 1/2012 | Joergensen et al. | 705/1.1 |
| 2012/0023375 A1* | 1/2012 | Dutta et al. | 714/47.2 |
| 2012/0066020 A1* | 3/2012 | Moon et al. | 705/7.28 |

OTHER PUBLICATIONS

Curino, C., et al., "Relational Cloud: A Database-as-a-Service for the Cloud," 5th Biennial Conference on Innovative Data Systems Research, Asilomar, CA, Jan. 2011.

Wolf Frameworks, "Multi Tenant Database Application Platform," http://www.wolfframeworks.com/multitenant.asp, Aug. 11, 2011.

* cited by examiner

CONTROLLING THE USE OF COMPUTING RESOURCES IN A DATABASE AS A SERVICE

CROSS-REFERENCE TO RELATED APPLICATIONS

This application is based upon and claims priority from prior Chinese Patent Application No. 201110401020.6, filed on Nov. 25, 2011, the entire disclosure of which is hereby incorporated by reference herein.

BACKGROUND OF THE INVENTION

The invention relates to database as a service (DBaaS) and, in particular, to controlling use of computing resources by multiple tenants in DBaaS.

Databases are widely used in applications of various organizations (such as enterprises, institutions and individuals). DBaaS is a mode of service in which centrally hosted databases are provided for computer applications of organizations. This kind of service mode is operated in the following manner. A service provider may deploy various databases in a cluster of computing systems and organizations that need to use the databases may order customized services from the service provider and become tenants of the DBaaS service. In that way, different tenants may share the databases running on the computing systems of the service provider.

In a DBaaS environment, databases may be running directly on physical machines. Alternatively, virtual machines (VM) may be employed to run databases. A virtual machine is a software structure designed to be able to execute computer programs like a physical machine, comprising software components capable of running a variety of executable codes, e.g., operating system (OS) codes, application programs and software drivers, etc.

One or more virtual machines may be installed on a single physical machine. In other words, a physical machine may be divided into one or more VM instances. Each individual VM instance may have respective operating system installed thereon. On the operating system, a database server is installed, then a database may be created.

DBaaS services allow multiple applications from different tenants to be connected to a single database running in the computing system. Applications from different tenants need to be isolated, and they consume different computing resources (hereinafter also briefly referred to as "resource"). Therefore, DBaaS may select a distinct sharing mode of service for a tenant according to SLA (Service Level Agreement).

Figure 2:
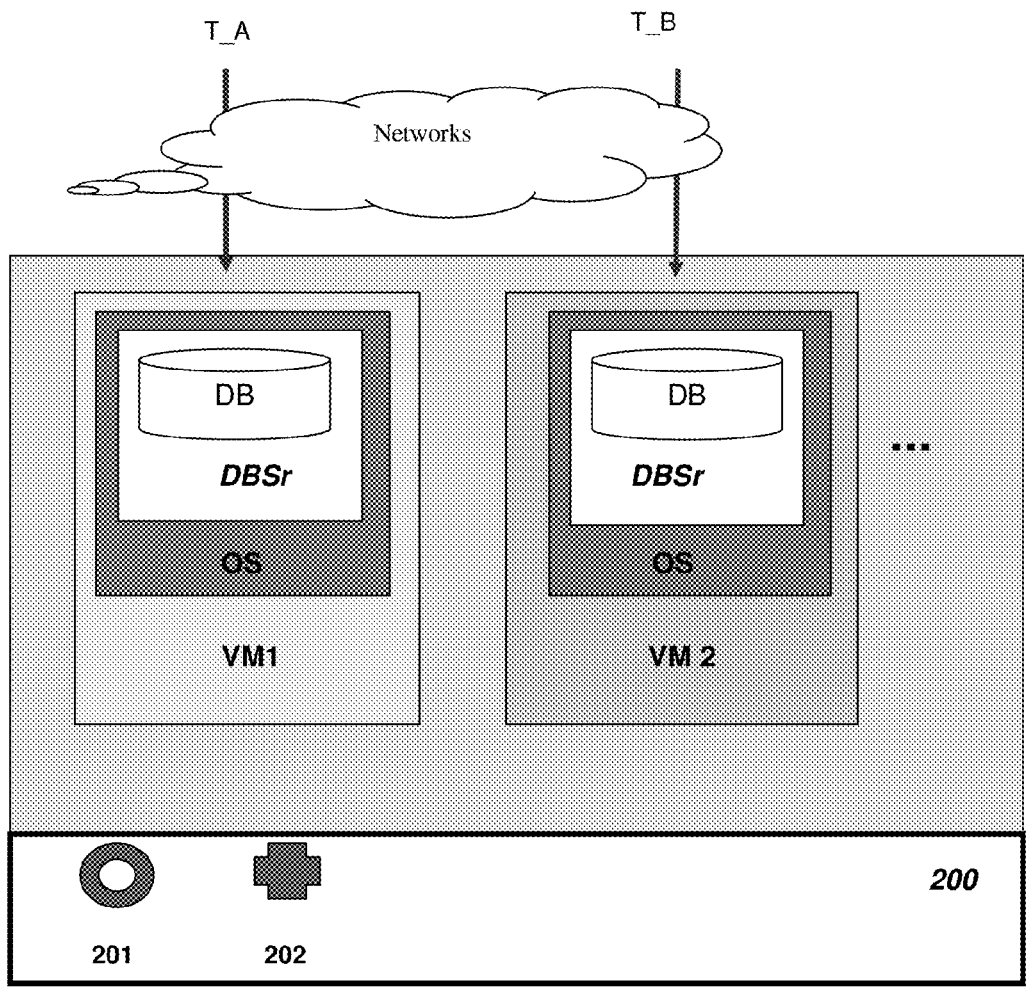

FIG. 2 shows a multi-tenancy (MT) sharing mode in DBaaS. In the sharing mode shown in FIG. 2, every tenant is allocated with a proprietary virtual machine. For example, tenant T_A and tenant T_B may respectively have exclusive use of the virtual machine VM1 and VM2 that are installed on a physical machine 200. VM1 and VM2 each has its own OS, database server DBSr and database DB. This sharing mode takes virtual machine as basic unit of resource allocation to control the use of resources by different tenants.

Beside the MT sharing mode shown in FIG. 2, in DBaaS, there are existed sharing modes of finer granularity that are more suitable for numerous middle and small tenants, where a plurality of tenants may share a VM or physical machine.

However, in the sharing mode shown in FIG. 2, resources are controlled with virtual machine as the basic unit for resource allocation. For example, for the use of CPU by tenants, only control can only be performed at CPU chip level. The mechanism of the sharing mode shown in FIG. 2 in controlling the use of resources by different tenants is not suitable for resource control of CPU and memory in tenancy sharing modes of finer granularity.

SUMMARY OF THE INVENTION

In one aspect of the invention, there is provided a method for controlling the use of computing resources by multiple tenants in DBaaS service, comprising: intercepting a task that is to access a computer resource, the task being an operating system process or thread; identifying a tenant that is in association with the task from the multiple tenants; determining other tasks of the tenant that access the computing resource; and controlling the use of the computing resource by the task, so that the total amount of usage of the computing resource by the task and the other tasks will not exceed the limit of usage of the computing resource for the tenant.

In another aspect of the invention, there is provided an apparatus for controlling the use of computing resources by multiple tenants in DBaaS service, comprising: a task intercepting module, configure to intercept a task that is to access a computer resource, the task being an operating system process or thread; a tenant Identifying module, configured to identify a tenant that is in association with the task from the multiple tenants; a task group determining module, configured to determine other tasks of the tenant that access the computing resource; and a resource control module, configured to control the use of the computing resource by the task, so that the total amount of usage of the computing resource by the task and the other tasks will not exceed the limit of usage of the computing resource for the tenant.

BRIEF DESCRIPTION OF THE ACCOMPANYING DRAWINGS

Figure 3:
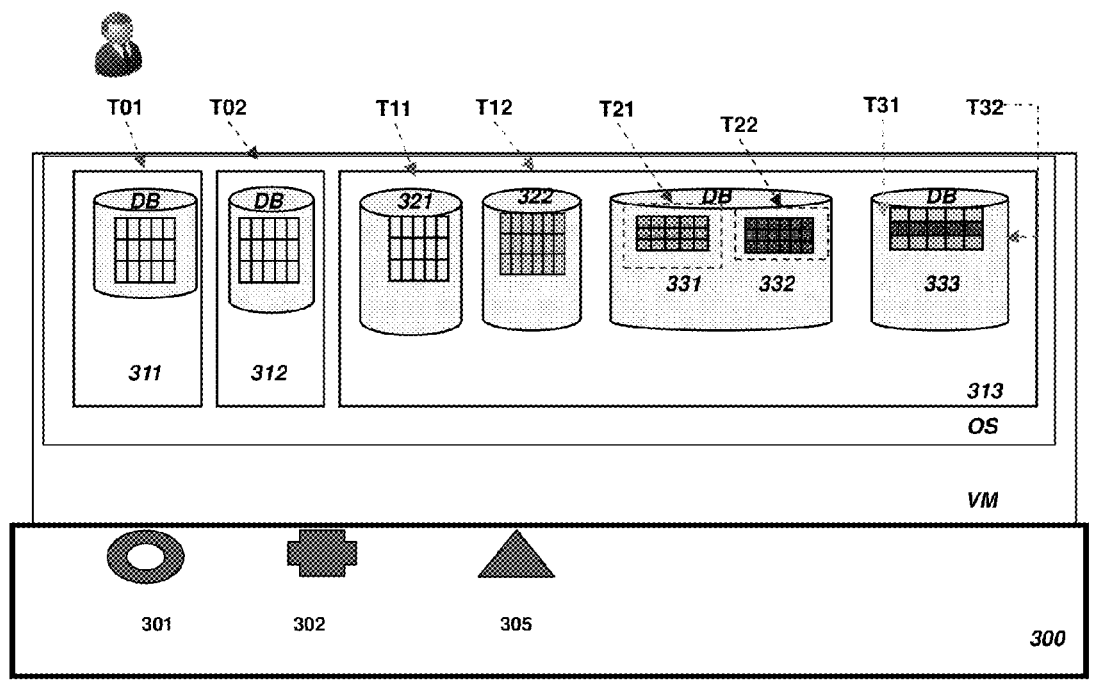
Figure 4:
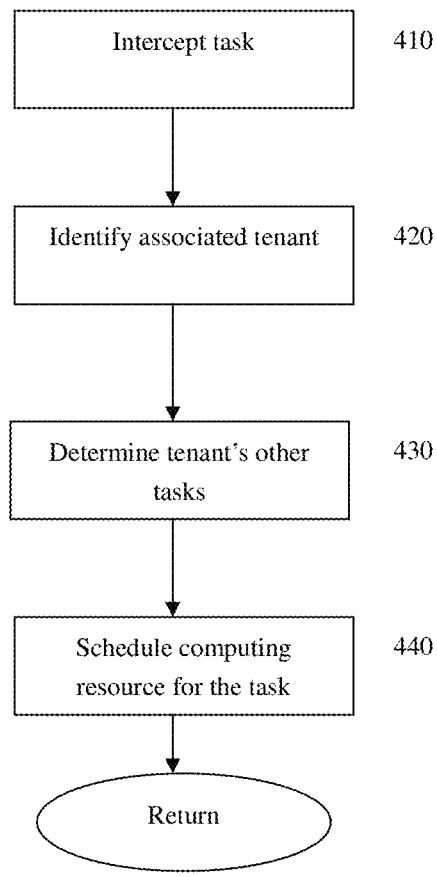
Figure 5:
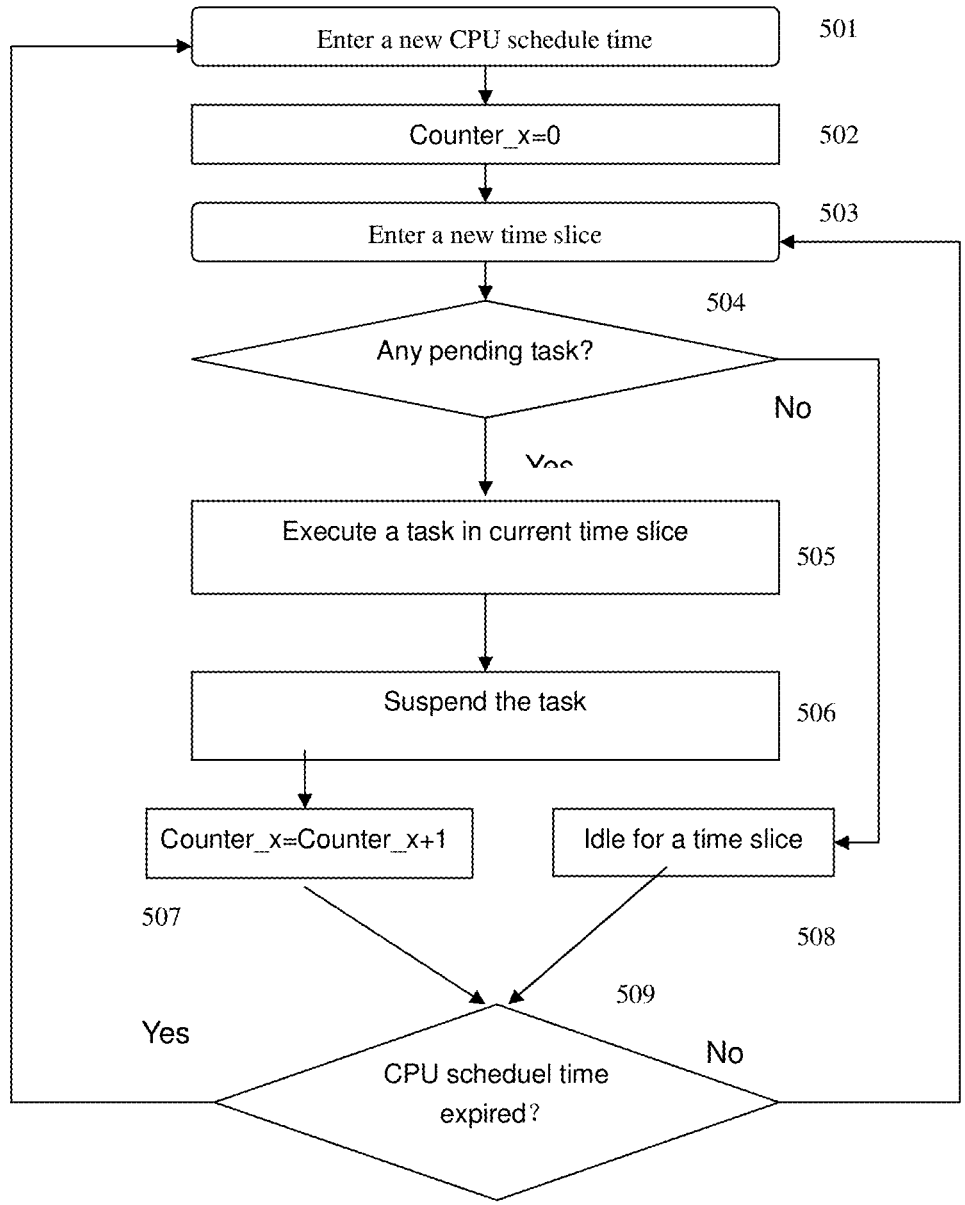
Figure 6:
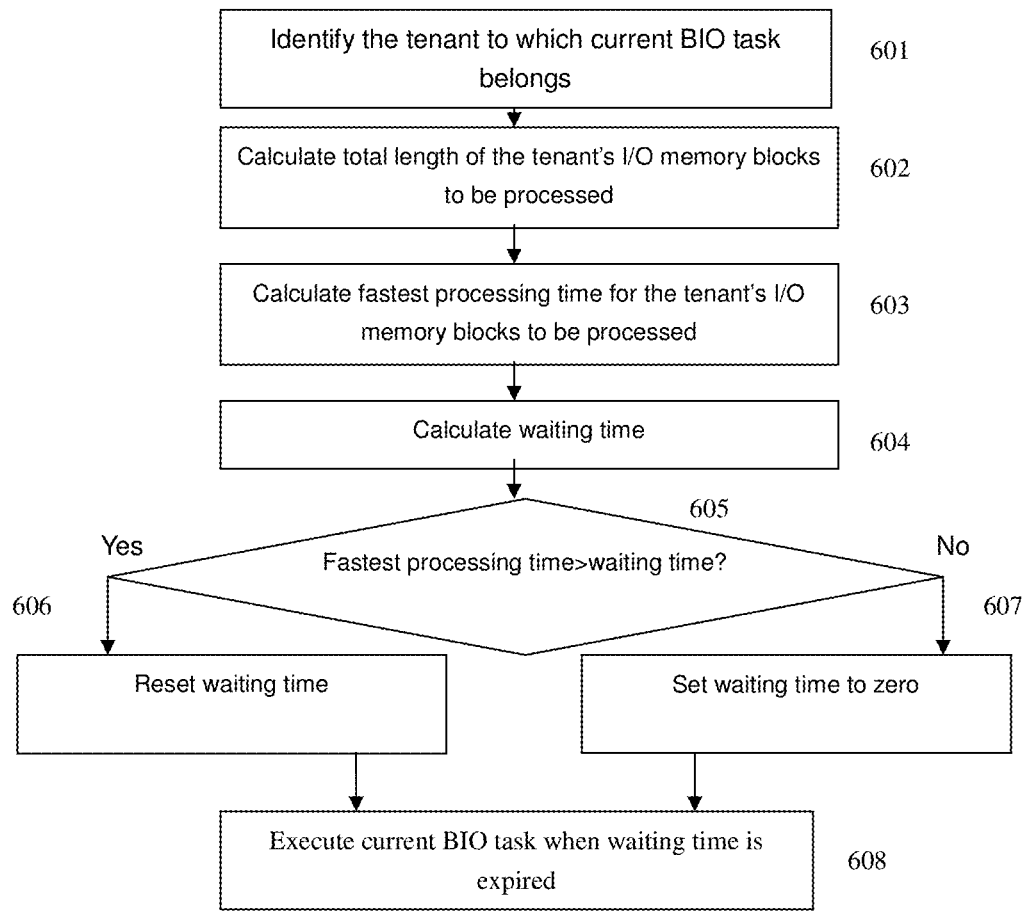
Figure 7:
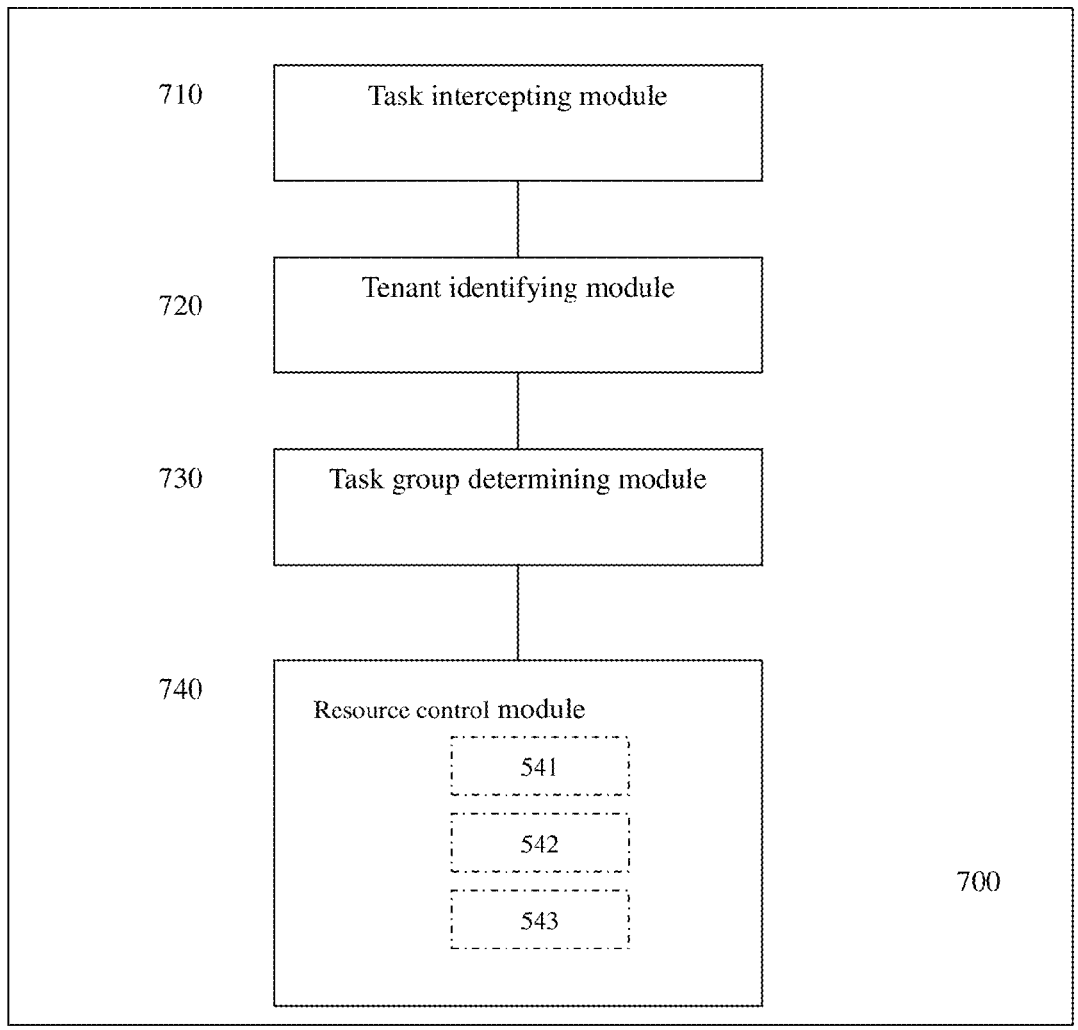

Features, advantages, and other aspects of various embodiments of the present invention will become more apparent through the following detailed description with reference to the following drawings, in which:

FIG. 1 shows the block diagram of an illustrative computing system 100 that is suitable for implementing embodiments of the invention;

FIG. 2 illustratively shows a multi-tenancy sharing mode in DBaaS service;

FIG. 3 illustratively shows MT sharing modes in DBaaS service in which various embodiments of the present invention may be implemented;

FIG. 4 illustratively shows a flow chart of the method for controlling the use of computing resources by multiple tenants in DBaaS service in accordance with one embodiment of the invention;

FIG. 5 illustratively shows a flow chart of the method for controlling tenants' use of the CPU resource in accordance with one embodiment of the invention;

FIG. 6 illustratively shows a flow chart of the method for controlling tenants' access to disk input/output in accordance with one embodiment of the invention; and FIG. 7 illustratively shows a block diagram of the apparatus for controlling the use of computing resources by multiple tenants in DBaaS service in accordance with one embodiment of the invention.

DETAILED DESCRIPTION OF THE INVENTION

The flowcharts and blocks in the figures illustrate the system, methods, as well as architecture, functions and operations executable by a computer program product according to embodiments of the present invention. In this regard, each block in the flowcharts or block may represent a module, a program segment, or a part of code, which contains one or more executable instructions for performing specified logic functions. It should be noted that, in some alternative implementations, the functions noted in the blocks may also occur in a sequence different from what is noted in the drawings. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

Hereinafter, the principle and spirit of the present invention will be described with reference to various exemplary embodiments. It should be understood that provision of these embodiments is only to enable those skilled in the art to better understand and further implement the present invention, not intended for limiting the scope of the present invention in any manner.

FIG. 1 shows a block diagram of an illustrative computing system 100 that is adapted to implement embodiments of the present invention. The computing system 100 shown in FIG. 1 comprises a CPU (central processing unit) 101, a RAM (random access memory) 102, a ROM (read-only memory) 103, a system bus 104, an hard disk controller 105, a keyboard controller 106, a serial interface controller 107, a parallel interface controller 108, a display controller 109, a hard disk 110, a keyboard 111, a serial peripheral 112, a parallel peripheral 113 and a display 114. Among these components, connected to the system bus 104 are: the CPU 101, the RAM 102, the ROM 103, the hard disk controller 105, the keyboard controller 106, the serial interface controller 107, the parallel interface controller 108 and the display controller 109. The hard disk 110 is connected to the hard disk controller 105; the keyboard 111 is connected to the keyboard controller 106; the serial peripheral 812 is connected to the serial interface controller 107; the parallel peripheral 113 is connected to the parallel interface controller 108; and the display 114 is connected to the display controller 109. It should be understood that the structural block diagram in FIG. 1 is shown only for illustration purpose, and is not intended to limit the scope of the present invention. In some cases, some devices may be added or reduced as required. For example, a network adapter may be configured for the computing system 100 so as to have the capacity of accessing computer networks.

The physical machine 200 shown in FIG. 2 may be implemented using such a computing system 100.

With reference to FIG. 3, it is now described below MT sharing modes in DBaaS service in which various embodiments of the present invention may be implemented.

FIG. 3 illustratively shows MT sharing modes in DBaaS service in which various embodiments of the present invention may be implemented. As shown, a DBaaS service was subscribe by eight tenants T01, T02, T11, T12, T21, T22, T31 and T32. The eight tenants share one virtual machine or one physical machine 300, i.e., they share the computing resources on a common VM or physical machine. In accordance with different SLAs, the eight tenants employ the following four different sharing modes.

Sharing mode (1): Each tenant has exclusive use of a single database server. For example, tenant T01 and T02 each has exclusive use of a database server 311 and a database server 312, respectively.

Sharing mode (2): At least two tenants share a common database server, and each of them has exclusive use of a database respectively. For example, T11 and T12 tenants share a common database server 313, and each of them has exclusive use of a database 321 and a database 322 respectively.

Sharing mode (3): at least two tenants share a common database on a database server, and each of them has exclusive use of a database schema respectively. For example, T21 and T22 tenants share a common database on a database server 313, and each of them has exclusive use of a database schema 331 and a database schema 332 respectively.

Sharing mode (4): At least two tenants share a common set of database tables of a database on a database server. For example, tenants T31 and T32 share a common set of database tables 333 of a database on a database server 313.

The 8 (eight) tenants employ the sharing modes which have finer granularity than the sharing mode shown in FIG. 2. The way by which the use of computing resources is controlled in the sharing mode shown in FIG. 2 is not suitable for the four sharing modes in FIG. 3. That is because, in the sharing mode shown in FIG. 2 wherein each tenant has a dedicated virtual machine, virtual machine technology is employed to realize the isolated control of the use of computing resources among multiple tenants. Virtual machine technology currently only supports the resource control for CPU and memory, and does not support the resource control for disk input/output. As to the control for CPU, it can only be realized at the level of CPU chip core. In other words, each tenant can be assigned one or more exclusive CPU chip cores, whereas the tenants in sharing modes (1)-(4) are of middle or small scale and each of them share a common CPU chip core with others, so the technique of CPU control based on the virtual machine technology can not satisfy the needs of the shared mode (1)-(4). However, if, in a sharing mode where there are many (e.g., hundreds of) sharing tenants, one tenant excessively occupied the CPU resource for some reason, it would adversely affect other tenants' reasonable use of the CPU resource. Therefore, it is necessary to control tenants' use of computing resources, such as CPU, in a DBaaS service.

Now with reference to FIG. 4, various embodiments of the method of the invention for controlling the use of computing resources by multiple tenants in a DBaaS service are described. FIG. 4 illustrates a flow chart of the method in accordance with one embodiment of the invention. As shown in FIG. 4, the method for controlling the use of computing resources by multiple tenants in a DBaaS service comprises the following steps.

In Step 410, a task that is to access a computing resource is intercepted.

The term "task" refers to a process or thread of the operating system (OS). Those skilled in the art would appreciate that, in DBaaS, when a database request from a tenant is issued, the database request is intercepted by the database server (311, 312, 313). The database server will initiate one or more tasks for the database request so as to serve the database request. This kind of tasks can be intercepted and then executed by the OS.

As is well known by those skilled in the art, tenants' database requests generally include system-level requests, maintenance-level requests and user-level request. System-level requests involve those operations such as system parameter configuration; maintenance-level requests involve those operations such as data backup and recovery; and user-level requests involve those operations such as content adding, deleting, changing and searching on the database.

As mentioned above, the database server, after intercepting a database request, will initiate one or more tasks to serve the database request.

In accordance with one embodiment of the present invention, in response to initiating at least one task for the database request, the relationship of the at least one task with the multiple tenants is identified.

The task that is to access a computing resource in Step 410 is one from the at least one task.

A tenant's user-level database request has information on the identity of the tenant or tenant identification ID. For example, a user-level database request from the tenant T01 having exclusive right to database server 311 may have the tenant identification "T01" attached to it; a user-level database request from the tenant T11 having exclusive right to database 321 may have tenant identification "T11" attached to it; and a user-level database request from the tenant T21 sharing database 331 with other tenants may have tenant identification "T21" attached to it. Therefore, when initiating a task for a user-level database request, the tenant ID attached to the database request may be propagated to the initiated task, so that the initiated task will also have the tenant ID attached to it. In this way, the relationship of a task serving the database request with a tenant may be identified.

A tenant's system-level database request or maintenance-level database request may have no information on the identity of the tenant, but may include a database identifier instead. For example, a system-level database request of the tenant T11, which involves the configuration of parameters, may have the database identifier "321" denoting that the database request is aimed at the database 321, but it may have no identity information of the tenant.

The relationship of a task serving a system-level database request or maintenance-level database request with a tenant can be identified in the following way. First, based on the relationship of a database with a tenant, the relationship of a system-level database request or maintenance-level database request with a tenant may be established, i.e., a tenant ID may be acquired. Then, the tenant ID is propagated to the initiated task so that the initiated task will have a tenant ID attached to it. For example, if a database request is a system-level request for the database 321, because the database 321 is exclusively used for the tenant T11, the association of the database request with the tenant T11 may be identified so as to make the database request to include the tenant ID "T11". Then, the tenant ID included in the database requests is propagated to the initiated task, making the initiated task to include the tenant ID "T11". In this way, the association of the task serving the database requested with the tenant T11 may be identified. task in the database with the tenants association.

The function of the embodiment of the invention may be performed by the database server.

In Step 420, a tenant that is in association with the task is identified from the multiple tenants.

The tenant in association with the task can be identified with the tenant ID included in the task. In general, the identifying results may be represented by a triple <resource ID, tenant ID, task ID>. For example, <CPU, T11, Task_i> denotes that the task Task_i is a task of the tenant T11 that is to access to CPU.

In Step 430, other tasks of the tenant that access the computing resource are identified.

For example, when the task Task_i of the tenant T11 is to access to the CPU, it is possible for the tenant T11 to have other tasks, say, Task_1, Task_2, . . . Task_i-1, that will access to the CPU. Step 430 is equivalent to find out all triples <CPU, T11, Task_1>, <CPU, T11, Task_2>, . . . , <CPU, T11, Task_i-1>.

In general, the following expression (1) may be used to represent n tasks of a tenant that are to access a computing resource:

<Resource ID, Tenant ID, Task_1, Task_2, . . . , Task_n>    (1), wherein the "Tenant ID" denotes a tenant, "Resource ID" denotes a computing resource and "Task_1", "Task_2", . . . , "Task_n" denote n tasks.

Thus, the other tasks that can be determined in Step 430 may be expressed as <CPU, T11, Task_1, Task_2, . . . , Task_i-1>.

As a result, the task and the other tasks that will access to the CPU may be determined to be <CPU, T11, Task_1, Task_2, . . . , Task_i-1, Task_i>, wherein "Task_i" is the task that is intercepted in Step 310.

In step 440, the use of the computing resource by the task is controlled, so that the total amount of usage of the computing resource by the task and the other tasks will not exceed the limit of usage of the computing resource for the tenant.

According to the present invention, in the four sharing modes in a DBaaS service shown in FIG. 3, there is a limit for the use of each computing resource for each tenant, i.e., the ceiling limit of usage.

Each tenant's use of each computing resource, in fact, comprises the use of the computing resource by all tasks that access to the computing resource. It may be represented using the following Expression (2):

<Resource ID, Threshold, Tenant ID, Task_1, Task_2, . . . , Task_n>    (2)

Compared to the expression (1), there is one additional parameter "Threshold" in the Expression (2), which denotes the ceiling limit of usage of the resource "Resource ID" for the tenant "Tenant ID". The Expression (2) means that there are currently n tasks of the tenant "Tenant ID" that are to access to the computing resource named "Resource ID", and the ceiling limit of usage of the resource "Resource ID" for the tenant "Tenant ID" is "Threshold".

For convenience of description, the Expression (2) is called a "task group". A task group of a tenant comprises all tasks belonging to the tenant that are to access to a particular computing resource, and the tasks are operating system processes or threads that serve database requests. Thus, a task group of a tenant is a set of processes/threads with the same tenant ID that are to access a certain computing resource.

In accordance with one embodiment of the present invention, a tenant's limit for use of a computing resource is allocated at the time when a customized DBaaS service is ordered by the tenant. In other words, each tenant may be allocated a limit for use of any computing resource when each of the multiple tenants orders the DBaaS service.

Types of computing resources include—but not limited to—the central processing unit (CPU), memory (MEM) and disk input/output (Disk_IO).

Now referring to FIG. 3, embodiments of Step 440 are described for different computing resources by way of example.

First, it is assumed that the computer resource is CPU 301.

The task Task_i intercepted in Step 410 is a task to access the computing resource CPU 301. In Step 420, the tenant associated with the task Task_i is identified; as an example, it is assumed that the tenant is identified to be tenant T11. In Step 430, it is determined the tenant T11's other tasks that are to access CPU 301 are Task_1, Task_2, . . . , Task_i-1.

According to the Expression (2), the group of tasks of the tenant T11 that are to access CPU 301 may be denoted as:

<CPU, CPU_T11, T11, Task_1, Task_2, ..., Task_i-1, Task_i>, wherein "CPU_T11" denotes the limit of usage of CPU for the tenant T11. The limit of usage may be represented in various ways. For example, it is a ratio of the total number of time slices in unit time of CPU scheduling.

In accordance with one embodiment of the present invention, Step 440 of controlling the use of computing resources by the task comprises: calculating the number of available time slices in unit time of CPU scheduling for the tenant according to the total number of time slices in unit time of CPU scheduling and the limit of usage of CPU for the tenant; within each unit time of CPU scheduling, allocating time slices for execution to the task and the other tasks until the number of time slices allocated reaches the number of available time slices.

For example, the limit of usage of CPU for the tenants T11 is a ratio of the total number of time slices in unit time of CPU scheduling, and the value of the ratio is 10%. If unit time of CPU scheduling (hereinafter also referred to as "CPU scheduling time") is 1 (one) second in length and comprises 1 million time slices each of 1 μs (microsecond) each in length, then, according to the limit of usage of CPU for the tenant T11, it may be calculated that the number of available time slices in unit time of CPU scheduling for the tenant is 1 million*10%=100 thousands.

All the tenant T11's tasks, Task_1, Task_2, ..., Task_i-1, Task_i, form a waiting queue. Other tenants also have their own waiting queues of the kind. The operating system OS repeatedly allocates time slices for the tasks in those waiting queues within each unit time of CPU scheduling.

Within each unit time of CPU scheduling the task Task_i and the other tasks Task_1, Task_2, ... Task_i-1 are allocated with time slices for execution, until the number of time slices allocated reaches the number of available time slices.

In practice, a counter with initial value of zero may be used for the tenant T11's tasks Task_1, Task_2, ..., Task_i-1, Task_i to count the time slices that have be used. When any one of the tasks is allocated with a time slice, the counter is incremented by one, and the task is executed within the allocated time slice before it is suspended to wait for allocation of another time slice. If the value of the counter reaches 100 thousand (100,000), it means that the number of time slices already consumed by the tasks of the tenant T11 reaches the number of available time slices. Therefore it is no longer allocated time slice to any task of the tenant within the current CPU scheduling time.

In this way, within any CPU scheduling time, the total number of time slices consumed by the tenant T11's tasks, Task_1, Task_2, ..., Task_i-1, Task_i, will not exceed the limit of usage of 100,000.

As to other time slices within each unit time of CPU scheduling, they may be allocated to CPU accessing tasks of other tenants than the tenant T11.

The description of the embodiment above is made from the perspective of allocating time slice to a CPU accessing tenant T11. In the following description is made on an embodiment of the method in accordance with the method of the present invention where there exist multiple tenants.

Assume currently there are n tenants T1, T2, ..., Tn that have CPU accessing task, wherein a tenant T1 has CPU accessing tasks of Task_11, Task_12, ..., Task_1i, and the number of time slice available for the tenant T1 is ts_T1; a tenant T2 has t has CPU accessing tasks of Task_21, Task_22, ..., Task_2i, and the number of time slice available for the tenant T2 is ts_T2; a tenant Tn has CPU accessing tasks of Task_n1, Task_n2, ..., Task_ni, the number of time slice available for the tenant Tn is ts_Tn. All of the CPU accessing tasks of the n tenants may be denoted with n task-groups below:

Task-group 1: <CPU, ts_T1, T1, Task_11, Task_12, ..., Task_1i>

Task Force 2: <CPU, ts_T2, T2, Task_21, Task_22, ..., Task_2i>

Task Group n: <CPU, ts_Tn, Tn, Task_n1, Task_n2, ..., Task_ni>.

FIG. 5 illustratively shows a flow chart of the method for controlling tenants' use of the CPU resource by in accordance with one embodiment of the invention. As shown in FIG. 5, in accordance with one embodiment of the invention, allocation of time slice for CPU accessing tasks of the tenants T1, T2, ..., Tn may be performed in the following steps.

In Step 501, a CPU scheduling time is entered.

In Step 502, the value of time-slice counter of each tenant, Counter_1, Counter_2, ..., Counter_n, is set to zero. The value of a counter is the number of time slices that have been allocated for the CPU accessing task of the corresponding tenant.

Then, in Step 503, a new time slice is entered.

In Step 504, it is determined whether or not there is any task waiting for allocation of CPU time in some task group x (x=1, ..., n) for which the value of Counter_x has not reached ts_Tx.

If yes, the process advances to Step 505. Otherwise, it is idled for a time slice 508, i.e., no task is executed in the time slice. Then, the process proceeds to Step 509.

In Step 505, a task Task_xi waiting for allocation of CPU time in the task group x is selected, and the task Task_xi is activated and executed within the current time slice.

For example, the task group x may be the one from task groups 1, 2, ..., n that has used the least number of time slices. Such a task group may be identified based on the time slice counter. Of course, the task group x may be identified in line with other strategies.

In Step 506, the task Task_xi that has been executed for the current time slice is suspended.

In Step 507, the value of the counter Counter_x is increased by one, and then the process proceeds to Step 509.

In step 509, it is determined whether or not the time a CPU scheduling time is reached. If not, return to Step 503; otherwise, return to Step 501.

In the process described above, the task waiting for allocation of CPU time that is determined in Step 504 is one in some task group x for which the value of Counter_x (x=1 ..., n) has not reached the corresponding number of time slices ts_Tx. In other words, within each CPU scheduling time, only those tasks that are in a task group for which the number of time slices already been used does not reach the number of available time slices are likely to be assigned new time slices. Therefore, the use of CPU by all tasks of the task group of any tenant shall not exceed the limit of usage of CPU for the tenant.

In that way, use of CPU 301 by the task_i of the tenant T11 in the example mentioned in the above may be controlled, so that the total usage of CPU 301 by the tenant T11's tasks Task_1, Task_2, ..., Task_i-1, Task_i will not exceed the limit of usage of CPU 301 for the tenant T11.

The following describes the implementation of Step 440 where the computing resource is memory MEM 302. In accordance with one embodiment of the present invention, Step 440 comprises: allocating memory for the task from the memory space reserved in accordance with the limit of usage of memory for the tenant, so that the total amount of usage of memory by the task and the other tasks will not exceed the limit of usage of the memory for the tenant.

The manners of implementation of Step 440 might vary slightly depending on differences among sharing modes.

Referring to FIG. 3 again, in sharing mode (1), tenant T01 and T02 each has exclusive use of a database server 311 and 312, respectively.

Similar to what is described in the above, the task Task_i intercepted in Step 410 is a task to access memory MEM 302. In Step 420, the tenant associated with the task Task_i is identified; as an example, it is assumed that the tenant is identified to be tenant T01. In Step 430, it is determined that other tasks of the tenant T01 that are to MEM 302 are Task_1, Task_2, ..., Task_i-1.

According to the Expression (2), the group of tasks of the tenant T01 that are to access MEM 302 may be expressed as:

<MEM, Mem_T01, T01, Task_1, Task_2, ..., Task_i-1, Task_i>, wherein "Mem_T01" is the limit of usage of memory for the tenant T01, for example, 1M bytes. The operating system has reserved memory space for the tenant T01 according to "Mem_T01".

Under the circumstance that the tenant T01 has exclusive use of the database server 311, the task Task_i might be an OS process; and if there exists other tasks, Task_1, Task_2, ..., Task_i-1, they share a common parent process with the task Task_i, i.e., the main process of the database server 311.

For the task Task_i, OS will allocate currently available memory within the reserved memory space, in the same way for other tasks Task_1, Task_2, ..., Task_i-1. Thus, it can be guaranteed that the use of memory by the tenant T01 will not exceed the predefined limit of usage.

In sharing modes (2), (3) and (4) shown in FIG. 3, tenants T11, T12, T21, T22, T31 and T32 share a database server 313.

Similar to what is described in the above, the task Task_i intercepted in Step 410 is one that is to access memory MEM 302, and it may be a thread level task of a tenant. In Step 420, the tenant associated with the task Task_i is identified; as an example, it is assumed that the tenant is identified to be tenant T11. In Step 430, other tasks of the tenant T01 that are to access MEM 302, Task_1, Task_2, ..., Task_i-1, are determined.

According to the Expression (2), the group of tasks of the tenant T11 that are to access MEM 302 may be expressed as:

<MEM, Mem_T11, T11, Task_1, Task_2, ..., Task_i-1, Task_i>, wherein "Mem_T11" is the limit of usage of memory for the tenant T11. The database server 313 has reserved memory space for the tenant T11 according to "Mem_T11".

Under the circumstance that database server 313 is shared by the tenant T11 and the other tenants, if there exists other tasks Task_1, Task_2, ..., Task_i-1, they may also be of thread level task.

The database server 313 will allocate memory for the task within the reserved memory space. In the same way, the database server 313 will allocate memory for other tasks, Task_1, Task_2, ..., Task_i-1, within the reserved memory space.

Since the database server 313 will allocate memory for the tenant T11's thread level tasks within the reserved memory space, it can be guaranteed that the use of memory by the tenant T11 will not exceed the predefined limit of usage.

Thus, no matter whether the an intercepted memory accessing task is a process-level one or thread-level one, the use of memory by the tenant, to which the task belongs, will not exceed the limit of usage of memory for the tenant.

The following describes the implementation of Step 440 where a plurality of tenants shares a common physical machine and the computing resource is disk input/output (Disk_IO) 303.

Similar to what is described in the above, the task Task_i intercepted in Step 410 is one requesting for Disk_IO 303. In Step 420, the tenant associated with the task Task_i is identified; as an example, it is assumed that the identified tenant is T11. In Step 430, it is determined that other tasks of the tenant T11 that request for Disk_IO303 are Task_1, Task_2, ..., Task_i-1.

According to the Expression (2), the task group i of tasks of the tenant T11 request for Disk_IO 303 may be expressed as:

<Disk_IO, Dio_T11, T11, Task_1, Task_2, ..., Task_i-1, Task_i>, wherein "Dio_T11" is the limit of usage of Disk_IO by tenant T11, which is usually represented by a rate of disk input/output. For example, while the total rate of disk input/output is 29 MB/S for the physical machine hosting the database server, the limit of usage Dio_T11 is 4 MB/S (4M bytes per second).

In accordance with one embodiment of the present invention, the task and the other tasks are divided, based on disk space vicinity, into a plurality of basic disk input/output or BIO (Basic_IO) tasks in association with the tenant; and the starting time of execution of each of the plurality of BIO tasks is controlled in accordance with the limit of usage of Disk_IO for the tenant, so that the total amount of usage of Disk_IO of the plurality of BIO tasks will not exceed the limit of usage of Disk_IO for the tenant.

In other words, the task Task_i and the tenant T11's other tasks, Task_1, Task_2, ..., Task_i-1, may be further divided a plurality of BIO tasks in association with the tenant T11; and then, the starting time of execution of each of the plurality of BIO tasks is controlled in accordance with the limit of usage of Disk_IO for the tenant, to ensure that the amount of disk input/output allocated to the task group i in unit time will not exceed the pre-defined limit of usage of Dio_T11.

In existing technology, the operating system may respond to a Disk_IO request by dividing the Disk_IO request into a plurality of tasks based on disk space vicinity. The number of memory block to be input/output for each BIO task may vary, for example, 240 bytes, 130 bytes etc. The present invention may divide the task Task_i BIO into a plurality of BIO tasks Bio_i1, Bio_i2, ... in similar way and associate them with the tenant T11. The tasks Task_1 ..., Task_i-1 (if any) are also split into a plurality of BIO tasks which are associated with the tenant T11.

With reference to FIG. 6 below, it is described how the starting time of execution of each of a plurality of BIO tasks of the tenant is controlled in accordance with the limit of usage of Disk_IO by a tenant. FIG. 6 illustratively shows a flow chart of the method for controlling tenants' access to disk input/output in accordance with one embodiment of the invention.

As shown, in accordance with one embodiment of the present invention, controlling the starting time of execution of each of the plurality of BIO tasks comprises the following process.

The process starts upon arrival of a current BIO task.

In Step 601, the tenant to which the current BIO task belongs is identified. In accordance with the present invention, the association of each BIO task with the tenant to which it belongs to has been established, thus the tenant to which the current BIO task belongs may be identified. As an example, assume that the tenant is T11 and the limit of usage of Disk_IO for the tenant T11 is Dio_T11.

In Step 602, the total length of memory blocks to be input/output of all BIO tasks associated with the tenant T11, for example, the total number of bytes, is calculated. Here, the total length is represented by L_all_bio.

At this point, all of the BIO tasks of the tenant T11 to be performed are in a waiting queue. Each tenant has such a wait queue.

In Step 603, the fastest processing time for all of the tenant's BIO tasks to be executed, t_fastest =L_all_bio/Dio_T11, is calculated based on the tenant T11's limit of usage of Disk_IO, wherein Dio_T11 denotes the tenant T11's limit of usage of Disk_IO, i.e., the limit of rate of disk input/output. The fastest processing time t_fastest denotes the expected shortest waiting time for all of the tenant's to-be-executed BIO tasks to be completed. Obviously, the greater the value of Dio_T11, the smaller the vale of t_fastest, that is, the shorter the expected shortest waiting time.

In Step 604, the wait time of the tenant T11 since the last BIO task is executed, t_wait, is calculated:

$$t\_wait=t\_CurrentTime-t\_Last\_Bio,$$

wherein t_CurrentTime denote the current time, and t_Last_Bio BIO denotes the time when execution of the last BIO task is start.

In Step 605, it is determined whether or not the fastest processing time for all of the tenant T11's BIO tasks to be executed is greater than the wait time of the tenant T11 since the last BIO task is executed, that is, whether or not t_fastest>t_wait.

If yes, indicating that the waiting time has not yet reached the fastest processing time, then the process advances to Step 606. Otherwise, indicating that the waiting time has reached or exceeded the fastest processing time, the process advances to Step 607.

In Step 606, the waiting time of the current BIO task is set: t_wait=t_fastest−t_wait. The purpose of the Step is to set the time limit of starting the execution of the current BIO task. Then, the process advances to Step 608.

In Step 607, the waiting time of the current BIO task, t_wait, is set to zero, that is, t_wait=0. That means the current BIO task should be executed immediately.

In Step 608, when the waiting time t_wait expires, execution of the current BIO task starts. That is, upon elapsing of time t_wait, execution of the current BIO task starts.

At the same time, t_Last_Bio is set to equal to t_CurrentTime to represent the time of execution of the BIO task.

If in Step 607, the waiting time t_wait is set to equal to zero, it means execution of the current BIO task is started immediately in Step 608.

If the waiting time t_wait set in Step 606 is not equal to zero, it means that in Step 608, it is after a length of time t_wait elapses that execution of the current BIO task starts.

The executed BIO task will be removed from the waiting queue.

By starting execution of the current BIO task only when the waiting time expires, it is ensured that the tenant's amount of disk input/output per unit time will not exceed the tenant's limit of usage of disk input/output.

Various embodiments of the method for controlling the use of computing resources by multiple tenants in DBaaS service in accordance with the invention have been described in the above with references to the drawings.

According to the same inventive concept, the present invention also provides an apparatus for controlling the use of computing resources by multiple tenants in DBaaS service.

Embodiments of the inventive apparatus are described below with reference to FIG. 7. FIG. 7 schematically shows a block diagram of the apparatus 700 for controlling the use of computing resources by multiple tenants in DBaaS service in accordance with one embodiment of the invention.

As shown, the apparatus 700 comprises a task intercepting module 710, a tenant identifying module 720, a task group determining module 730 and a resource control module 740.

The task intercepting module 710 is configured to intercept a task that is to access a computer resource, the task being an operating system process or thread;

The tenant identifying module 720 is configured to identify a tenant that is in association with the task from the multiple tenants;

The task group determining module 730 is configured to determine other tasks of the tenant that access the computing resource; and The resource control module 740 is configured to control the use of the computing resource by the task, so that the total amount of usage of the computing resource by the task and the other tasks will not exceed the limit of usage of the computing resource for the tenant.

According to one embodiment of the invention, the limit of usage of the computing resource for the tenant is allocated when the tenant subscribed the DBaaS service.

According to one embodiment of the invention, the apparatus 700 further comprises a relation identifying module, which is configured to identify the relationship of the at least one task with said multiple tenants in the DBaaS service in response to initiating at least one task for a database request.

According to one embodiment of the invention, each of the multiple tenants shares the computing resource of a same virtual machine or physical machine in one of the following ways: having exclusive use of a single database server; sharing a common database server with other tenants of the multiple tenants wherein each of the sharing tenants has exclusive use of a database respectively; sharing a common database on a database server with other tenants of the multiple tenants wherein each of the sharing tenants has exclusive use of a database schema respectively; or sharing a common set of database tables of a database on a database server with other tenants of the multiple tenants.

According to one embodiment of the invention, the resource control module 740 comprises a CPU resource controller 741 which is configured to calculate the number of available time slices in unit time of CPU scheduling for the tenant according to the total number of time slices in unit time of CPU scheduling and the limit of usage of CPU for the tenant; and the CPU resource controller is further configured to, within each unit time of CPU scheduling, allocate time slices for execution to all of the tenant's CPU-accessing tasks until the number of time slices allocated reaches the number of available time slices.

According to one embodiment of the invention, the resource control module 740 comprises a memory resource controller 742, which is configured to allocate memory for the task from the memory space reserved in accordance with the limit of usage of memory for the tenant, so that the total amount of usage of memory by the task and the tenant's other memory-accessing tasks will not exceed the limit of usage of the memory for the tenant.

According to one embodiment of the invention, each tenant of the multiple tenants has exclusive use of a single database server and the task is a process of the operating system. The memory resource controller 742 is further configured to allocate memory for the task from the memory space reserved in accordance with the limit of usage of memory for the tenant, so that the total amount of usage of memory by the task and the tenant's other memory-accessing tasks will not exceed the limit of usage of the memory for the tenant.

According to one embodiment of the invention, the resource control module 740 comprises a disk input/output resource controller 743, which is configured to divide the task and the other tasks, based on disk space vicinity, into a plurality of basic disk input/output or BIO tasks in association with the tenant; and to control the starting time of execution of each of the plurality of BIO tasks in accordance with the limit of usage of Disk_IO for the tenant, so that the total amount of usage of Disk_IO of the plurality of BIO tasks will not exceed the limit of usage of Disk_IO for the tenant.

The above has described the apparatus for controlling the use of a computing resource by multiple tenants in DBaaS service according to embodiments of the present invention. Because the method for controlling the use of a computing resource by multiple tenants in DBaaS service according to embodiments of the present invention has been described in detail in the above, the description of the apparatus omits the content that repeats or may be derived from the description of the method.

It should be noted that the above depiction is only exemplary, not intended for limiting the present invention. In other embodiments of the present invention, this method may have more, or less, or different steps, and numbering the steps is only for making the depiction more concise and much clearer, but not for stringently limiting the sequence between each steps, while the sequence of steps may be different from the depiction.

For example, in some embodiments, the above one or more optional steps may be omitted. Specific embodiment of each step may be different from the depiction. All these variations fall within the spirit and scope of the present invention.

The present invention may adopt a form of hardware embodiment, software embodiment or an embodiment comprising hardware components and software components. In a preferred embodiment, the present invention is implemented as software, including, without limitation to, firmware, resident software, micro-code, etc.

Moreover, the present invention may be implemented as a computer program product usable from computers or accessible by computer-readable media that provide program code for use by or in connection with a computer or any instruction executing system. For the purpose of description, a computer-usable or computer-readable medium may be any tangible means that can contain, store, communicate, propagate, or transport the program for use by or in connection with an instruction execution system, apparatus, or device.

The medium may be an electric, magnetic, optical, electromagnetic, infrared, or semiconductor system (apparatus or device), or propagation medium. Examples of the computer-readable medium would include the following: a semiconductor or solid storage device, a magnetic tape, a portable computer diskette, a random access memory (RAM), a read-only memory (ROM), a hard disk, and an optical disk. Examples of the current optical disk include a compact disk read-only memory (CD-ROM), compact disk-read/write (CR-ROM), and DVD.

A data processing system adapted for storing or executing program code would include at least one processor that is coupled to a memory element directly or via a system bus. The memory element may include a local memory usable during actually executing the program code, a mass memory, and a cache that provides temporary storage for at least one portion of program code so as to decrease the number of times for retrieving code from the mass memory during execution.

An Input/Output or I/O device (including, without limitation to, a keyboard, a display, a pointing device, etc.) may be coupled to the system directly or via an intermediate I/O controller.

It is to be understood from the foregoing description that modifications and alterations may be made to the respective embodiments of the present invention without departing from the true spirit of the present invention. The description in the present specification is intended to be illustrative and not limiting. The scope of the present invention is limited by the appended claims only.

It is to be understood from the foregoing description that modifications and alterations may be made to the respective embodiments of the present invention without departing from the true spirit of the present invention. The description in the present specification is intended to be illustrative and not limiting. The scope of the present invention is limited by the appended claims only.

What is claimed is:

1. A method for controlling use of a computing resource by multiple tenants in DBaaS service, comprising:
intercepting a task that is to access a computing resource, the task being an operating system process or thread;
identifying a tenant that is in association with the task from the multiple tenants;
determining other tasks of the tenant that access the computing resource; and
controlling the use of the computing resource by the task, so that a total amount of usage of the computing resource by the task and the other tasks does not exceed a limit of usage of the computing resource for the tenant, wherein each tenant of the multiple tenants has a dedicated virtual machine sharing a common physical machine and the computing resource is disk input/output, and wherein said controlling the use of the computing resource by the task comprises:
dividing the task and the other tasks, based on disk space vicinity, into a plurality of basic disk input/output (BIO) tasks in association with the tenant;
controlling a starting time of execution of each of the plurality of BIO tasks in accordance with a limit of usage of Disk_IO for the tenant, so that the total amount of usage of Disk_IO of the plurality of BIO tasks does not exceed the limit of usage of Disk_IO for the tenant;
calculating a fastest processing time of the BIO tasks associated with the tenant; and
calculating a waiting time based upon a limit of usage of Disk IO associated with the tenant, wherein
the controlling the starting time of the execution further executes a current BIO task based upon the fastest processing time not being greater than the waiting time.

2. The method of claim 1, wherein the limit of usage of the computing resource for the tenant is allocated when the tenant subscribes the DBaaS service.

3. The method of claim 2, further comprising:
in response to initiating at least one task for a database request, identifying a relationship of the at least one task with said multiple tenants,
wherein said task that is to access a computing resource is from the at least one task.

4. The method of claim 3, wherein each of the multiple tenants shares the computing resource of the physical machine in one or more of the following ways:
having exclusive use of a single database server;

sharing a common database server with other tenants of the multiple tenants wherein each of the sharing tenants has exclusive use of a database respectively;

sharing a common database on a database server with other tenants of the multiple tenants wherein each of the sharing tenants has exclusive use of a database schema respectively; and sharing a common set of database tables of a database on a database server with other tenants of the multiple tenants.

5. The method of claim 4, wherein the computing resource further includes a central processing unit (CPU) and said controlling the use of the computing resource by the task comprises:

calculating a number of available time slices in unit time of CPU scheduling for the tenant according to a total number of time slices in unit time of CPU scheduling and a limit of usage of CPU for the tenant; and within each unit time of CPU scheduling, allocating time slices for execution to the task and the other tasks until the number of time slices allocated reaches the number of available time slices.

6. The method according to claim 5 wherein the time slice has a time duration of less than one second.

7. The method according to claim 5 wherein the unit time has a duration of one second and the time slice has a duration of less than one second.

8. The method according to claim 7 wherein the time slice has a duration of one microsecond.

9. The method of claim 4, wherein the computing resource further includes memory and said controlling the use of the computing resource by the task comprises:

allocating memory for the task from a memory space reserved in accordance with a limit of usage of memory for the tenant, so that a total amount of usage of memory by the task and the other tasks will not exceed the limit of usage of the memory for the tenant.

10. The method of claim 9, wherein each tenant of the multiple tenants has exclusive use of a single database server and the task is a process of the operating system.

11. An apparatus for controlling use of computing resources by multiple tenants in DBaaS service, comprising:

a task intercepting module, configure to intercept a task that is to access a computing resource, the task being an operating system process or thread;

a tenant identifying module, configured to identify a tenant that is in association with the task from the multiple tenants;

a task group determining module, configured to determine other tasks of the tenant that access the computing resource; and a resource control module, configured to control the use of the computing resource by the task, so that a total amount of usage of the computing resource by the task and the other tasks does not exceed a limit of usage of the computing resource for the tenant, wherein each tenant of the multiple tenants has a dedicated virtual machine sharing a common physical machine and the computing resource is disk input/output, and wherein said controlling the use of the computing resource by the task further includes:

dividing the task and the other tasks, based on disk space vicinity, into a plurality of basic disk input/output (BIO) tasks in association with the tenant;

controlling a starting time of execution of each of the plurality of BIO tasks in accordance with a limit of usage of Disk_IO for the tenant, so that the total amount of usage of Disk_IO of the plurality of BIO tasks does not exceed the limit of usage of Disk_IO for the tenant;

calculating a fastest processing time of the BIO tasks associated with the tenant; and calculating a waiting time based upon a limit of usage of Disk IO associated with the tenant, wherein the controlling the starting time of the execution further executes a current BIO task based upon the fastest processing time not being greater than the waiting time.

12. The apparatus of claim 11, wherein the limit of usage of the computing resource for the tenant is allocated when the tenant subscribes the DBaaS service.

13. The apparatus of claim 12, further comprising:

a relation identifying module configured to identify a relationship of at least one task with said multiple tenants in response to initiating at least one task for a database request.

14. The apparatus of claim 13, wherein each of the multiple tenants shares the computing resource of the physical machine in one or more of the following ways:

having exclusive use of a single database server;

sharing a common database server with other tenants of the multiple tenants wherein each sharing tenant have exclusive use of a database respectively;

sharing a common database on a database server with other tenants of the multiple tenants wherein each of the sharing tenants has exclusive use of a database schema respectively; and sharing a common set of database tables of a database on a database server with other tenants of the multiple tenants.

15. The apparatus of claim 14, wherein the resource control module comprises a CPU resource controller which is configured to calculate a number of available time slices in unit time of CPU scheduling for the tenant according to a total number of time slices in unit time of CPU scheduling and a limit of usage of CPU for a tenant; and the CPU resource controller is further configured to, within each unit time of CPU scheduling, allocate time slices for execution to all CPU-accessing tasks of the tenant until the number of time slices allocated reaches the number of available time slices.

16. The apparatus of claim 14, wherein the resource control module comprises a memory resource controller which is configured to allocate memory for the task from a memory space reserved in accordance with a limit of usage of memory for the tenant, so that a total amount of usage of memory by the task and other memory-accessing tasks of the tenant do not exceed the limit of usage of the memory for the tenant.

17. The apparatus of claim 16, wherein each tenant of the multiple tenants has exclusive use of a single database server and the task is a process of an operating system.

18. A computer program product for controlling use of a computing resource by multiple tenants in DBaaS service, the computer program product comprising:

a tangible non-transitory computer-readable storage medium; and computer program instructions for intercepting a task that is to access a computing resource, the task being an operating system process or thread, identifying a tenant that is in association with the task from the multiple tenants, determining other tasks of the tenant that access the computing resource, and controlling the use of the computing resource by the task, so that a total amount of usage of the computing resource by the task and the other tasks does not exceed a limit of usage of the computing resource for the tenant, wherein each tenant of the multiple tenants has a dedicated virtual machine sharing a common physical machine and the computing resource is disk input/output, and wherein said controlling the use of the computing resource by the task comprises:

dividing the task and the other tasks, based on disk space vicinity, into a plurality of basic disk input/output (BIO) tasks in association with the tenant;

controlling a starting time of execution of each of the plurality of BIO tasks in accordance with a limit of usage of Disk_IO for the tenant, so that the total amount of usage of Disk_IO of the plurality of BIO tasks does not exceed the limit of usage of Disk_IO for the tenant, calculating a fastest processing time of the BIO tasks associated with the tenant; and calculating a waiting time based upon a limit of usage of Disk IO associated with the tenant, wherein the controlling the starting time of the execution further executes a current BIO task based upon the fastest processing time not being greater than the waiting time.

* * * * *